(12) United States Patent
Reed et al.

(10) Patent No.: US 10,372,833 B2
(45) Date of Patent: Aug. 6, 2019

(54) PART STANDARD GEOMETRY MANAGEMENT IN A COMPUTER AIDED DESIGN SYSTEM

(75) Inventors: Darwin G Reed, Spanaway, WA (US); Mark A. Dahl, Kent, WA (US); Jerry K. Lawrence, Lake Sherwood, MO (US); David P. Knawa, Vail, AZ (US)

(73) Assignee: The Boeing Company, Chicago, IL (US)

(*) Notice: Subject to any disclaimer, the term of this patent is extended or adjusted under 35 U.S.C. 154(b) by 1166 days.

(21) Appl. No.: 12/262,629

(22) Filed: Oct. 31, 2008

(65) Prior Publication Data
US 2009/0259440 A1     Oct. 15, 2009

Related U.S. Application Data

(60) Provisional application No. 61/044,730, filed on Apr. 14, 2008.

(51) Int. Cl.
| | | |
|---|---|---|
| G06F 17/50 | (2006.01) | |
| G06G 7/48 | (2006.01) | |
| G06F 17/00 | (2019.01) | |
| G06F 19/00 | (2018.01) | |

(52) U.S. Cl.
CPC ......... *G06F 17/50* (2013.01); *G06F 2217/04* (2013.01)

(58) Field of Classification Search
USPC .................................. 703/1, 7, 8; 700/90, 98
See application file for complete search history.

(56) References Cited

U.S. PATENT DOCUMENTS

| | | | | |
|---|---|---|---|---|
| 5,594,837 | A | | 1/1997 | Noyes |
| 5,701,403 | A | * | 12/1997 | Watanabe et al. ............ 345/419 |
| 5,896,138 | A | * | 4/1999 | Riley ............................ 345/440 |
| 5,945,995 | A | * | 8/1999 | Higuchi et al. ............... 345/420 |
| 6,295,513 | B1 | * | 9/2001 | Thackston ....................... 703/1 |
| 6,571,146 | B1 | | 5/2003 | Dennehy |
| 6,629,093 | B1 | * | 9/2003 | Davis et al. .................. 707/722 |
| 6,867,771 | B2 | * | 3/2005 | Kripac .......................... 345/420 |
| 6,931,294 | B2 | | 8/2005 | Macy et al. |
| 7,398,129 | B2 | | 7/2008 | Ishii et al. |
| 7,469,242 | B2 | | 12/2008 | Tompras et al. |

(Continued)

OTHER PUBLICATIONS

U.S. Appl. No. 12/577,149, filed Oct. 9, 2009, Suhr et al.

(Continued)

*Primary Examiner* — Aniss Chad
*Assistant Examiner* — Nithya J. Moll
(74) *Attorney, Agent, or Firm* — Yee & Associates, P.C.

(57) ABSTRACT

A computer implemented method for managing parts used by different types of computer aided design systems. A master model of a part may be created. The master model is independent of a format used by the different types of computer aided design systems to handle parts. A view of the master model is created to form a geometric view in response to a request to distribute the part. The geometric view comprises parametric information about the part and dimension information for the part. A specific part model usable by the selected type of computer aided design system is created from the content stored in the storage system in response to a request for the part for use by a selected type of computer aided design system. The instance of the part is sent to the selected type of computer aided design system.

24 Claims, 9 Drawing Sheets

(56) References Cited

U.S. PATENT DOCUMENTS

| | | | |
|---|---|---|---|
| 7,495,662 B2 | 2/2009 | Rameau et al. | |
| 7,912,692 B2 | 3/2011 | Matsushita et al. | |
| 8,301,419 B1 | 10/2012 | Suhr et al. | |
| 2003/0220911 A1 | 11/2003 | Tompras et al. | |
| 2005/0071135 A1* | 3/2005 | Vredenburgh et al. | 703/1 |
| 2006/0265496 A1* | 11/2006 | Freitag | 709/224 |
| 2008/0312880 A1 | 12/2008 | McLuckie | |

OTHER PUBLICATIONS

USPTO non-final office action dated Feb. 9, 2012 regarding U.S. Appl. No. 12/577,149, 21 pages.

USPTO notice of allowance dated Jun. 19, 2012 regarding U.S. Appl. No. 12/577,149, 12 pages.

Canli, "A Visual Meta-Language for Generic Modeling," Thesis, Department of the Air Force, Air Force Institute of Technology, Mar. 2002, 188 pages.

Mantyla, "A Modeling system for top-down design of assembled products," IBM Journal of Res. Development, vol. 34, No. 5, Sep. 1990, 24 pages.

Saleh et al., "On the Way to Modeling: A Case Study in Managing Model Transformations in MDA," Proceedings of the 9th WSEAS International Conference on Distance Learning and Web Engineering, Dec. 2009, pp. 89-103.

Selveit, "An Abstraction-Based Rule Approach to Large-Scale Information Systems Development," CAiSE '93 Proceedings of Advanced Information Systems Engineering, Jun. 1993, pp. 328-351.

Stoiber et al., "Visualization Support for Software Product Line Modeling," 2nd International Workshop in Visualization in Software Product Line Engineering (ViSPLE '08), Sep. 2008, 10 pages.

Van Amerongen et al., "Modeling of physical systems for the design and control of mechatronic systems," Annual Reviews in Control, vol. 27, Elsevier Ltd., 2003, pp. 87-117.

\* cited by examiner

PART STANDARD GEOMETRY MANAGEMENT IN A COMPUTER AIDED DESIGN SYSTEM

CROSS REFERENCE TO RELATED APPLICATIONS

The present invention claims priority from the following patent application: entitled "Part Management in a Computer Aided Design System", Ser. No. 61/044,730, filed Apr. 14, 2008, which is incorporated herein by reference.

BACKGROUND INFORMATION

1. Field

The present disclosure relates generally to an improved data processing system and in particular to a method and apparatus for processing data. Still more particularly, the present disclosure relates to a computer implemented method, apparatus, and computer usable program code for managing part standard geometry in one or more computer aided design systems in a part management environment.

2. Background

Computer aided design involves the use of computers or other data processing systems to aid in the design of a product. These types of designs may include two-dimensional vector based drafting systems and three-dimensional solid and surface modeling programs. Computer aided design systems are used to design, develop, and optimize products. These types of systems are typically used for detailed engineering of three-dimensional and/or two-dimensional drawings of physical components.

Computer aided design programs are commonly used in aerospace manufacturing to produce various products such as aircraft, space vehicles, aircraft engines, and other related components. Computer aided design programs allow designers or engineers to layout and develop various designs and products on a screen. These designs may be saved for future use and/or editing.

In designing products, libraries of components or parts are commonly present in a computer aided design system. Within organizations using multiple computer aided design systems, a duplication of standard shapes may occur within each different computer aided design system. For example, a company may use a program, such as Catia, which is available from Dassault Systemes, S.A. The same company also may use AutoCAD, which is available from Autodesk, Inc.

Each of these computer aided design applications may include duplicates of data for different parts or shapes within each system. If the organization first uses an AutoCAD computer aided design system and then adds a Catia computer aided design system, the library of parts in the AutoCAD system are reproduced or created again for a library through the Catia system.

This situation requires time, expense, and resources to recreate the standard parts used in the first computer aided design program for use in the second computer aided design program. This type of process typically requires personnel to transfer the data from one platform to another platform. In other words, time and effort is needed to re-enter the data from one platform to another platform.

Oftentimes, these parts include information in addition to the shape or physical model. This information may include, for example, attributes describing the particular model. For example, a part for a bolt includes, for example, information about the size of the bolt, material, a product number, and a manufacturer. This type of information typically has to be re-entered when recreating the part for another platform.

Further, when new parts are recreated, those parts are created for each platform within an organization or company. As the number of parts increase and the number of platforms increase, this problem is compounded and increases in complexity. Therefore, it would be advantageous to have a method and apparatus that overcomes the above-described problems.

SUMMARY

The advantageous embodiments provide a computer implemented method for managing parts used by a plurality of different types of computer aided design systems. A master model of a part may be created wherein the master model is independent of a format used by the plurality of different types of computer aided design systems to handle the parts. A view of the master model capable of being used to create a three-dimensional model of the part to form a geometric view is created in response to a request to distribute the part. The geometric view comprises parametric information about the part and dimension information for the part. A part model usable by the selected type of computer aided design system may be created from the content stored in a storage system to form an instance of the part in response to a request for the part for use by a selected type of computer aided design system in the plurality of different types of computer aided design systems. The instance of the part may be sent for use by the selected type of computer aided design system.

In another advantageous embodiment, a computer implemented method is present for managing parts. Parts standard data may be created for a part. The parts standard data has a set of views comprising a document view, a data view, and a geometric view for the part. The set of views may be distributed for the part within a network data processing system in which a plurality of different types of computer aided design systems is present.

In yet another advantageous embodiment, an apparatus comprises a network data processing system and a part management environment. The part management environment executes on the network data processing system. The part management environment comprises a selection service capable of receiving user input containing selection criteria for a part and generating a request for a part model useable in a particular computer aided design system. A geometry service may be capable of creating an explicit computer aided geometry from the request and a product standards application service may be capable of applying metadata to the explicit computer aided geometry to form the part model.

In still yet another advantageous embodiment, a part management environment comprises an authoring component, a distribution component, a geometry server, a standards application, and a part management component. The authoring component may be capable of creating data for a set of parts in a format independent of any view. The distribution component may be capable of transforming the data for a part in the set of parts into a view for use by clients. The geometry server may be capable of creating a geometric view of the part in the set of parts generated by the distribution component into a format specific to a computer aided design system to form an explicit computer aided design geometry in response to a request for the part. The standards application may be capable of using standard parts metadata and the explicit computer aided design geometry to form a part model for use by the computer aided design system. The part management component may be capable of storing a set of part models and distributing the set of part models to computer aided design systems.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
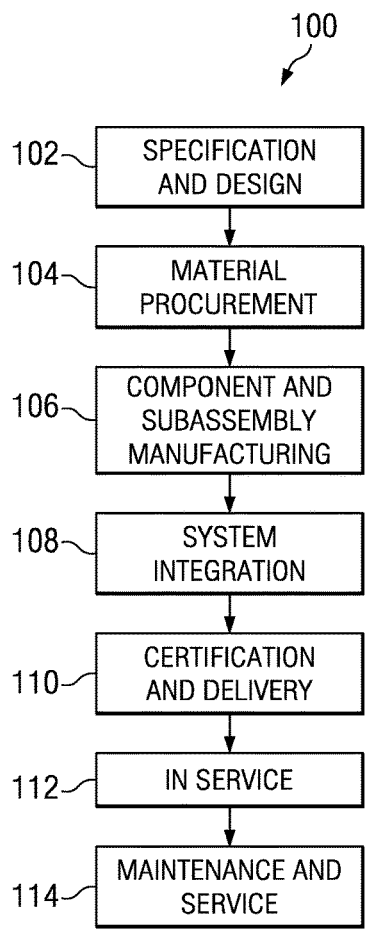
FIG. 1 is a diagram illustrating an aircraft manufacturing and service method in accordance with an advantageous embodiment.
Figure 2:
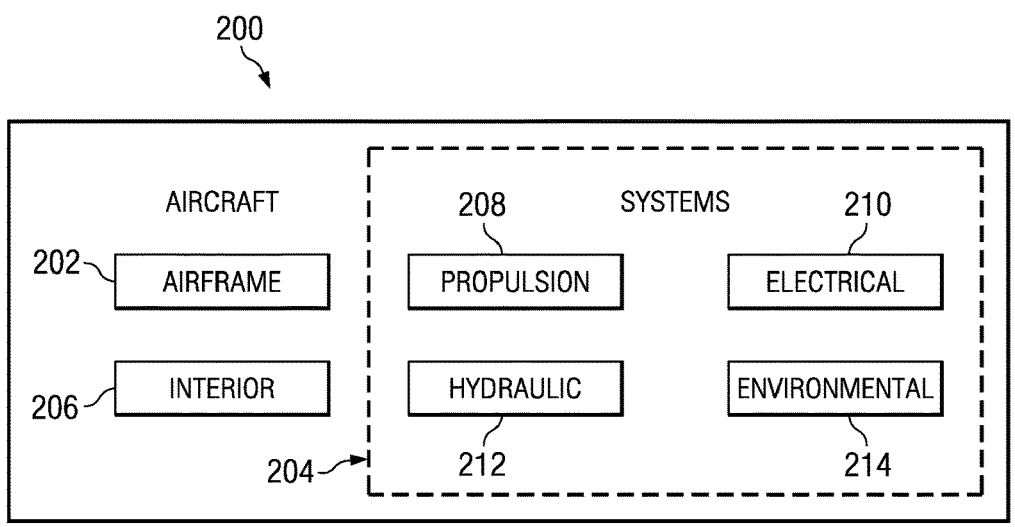
FIG. 2 is a diagram of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, different components may be designed using various advantageous embodiments during specification and design 102 in these examples. The use of the different advantageous embodiments may reduce the cost in the specification and design of different components or items resulting in a reduction of cost of aircraft 200.

Similarly, one or more of apparatus embodiments, method embodiments, or a combination thereof may be utilized while aircraft 200 is in service 112 or during maintenance and service 114 in FIG. 1. For example, the different advantageous embodiments may be used to design new parts or replacement parts during maintenance and service 114.

Figure 3:
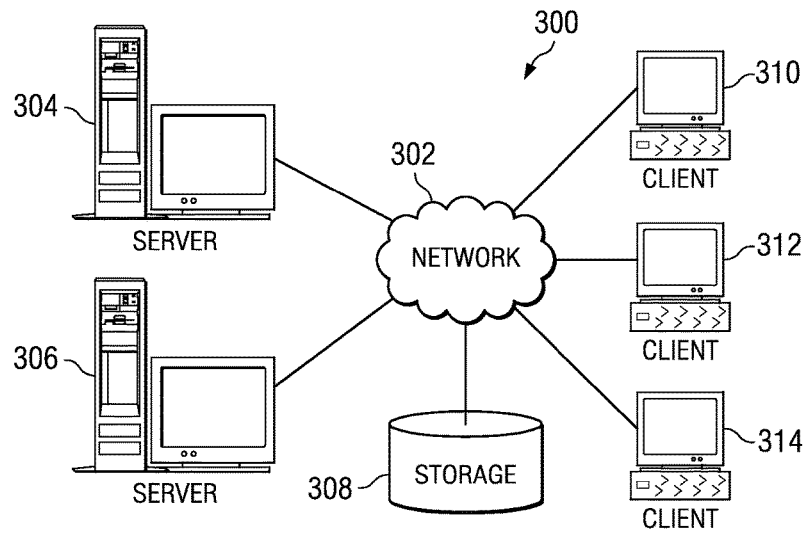
FIG. 3 is an exemplary diagram of a data processing environment in which illustrative embodiments may be implemented.
Figure 4:
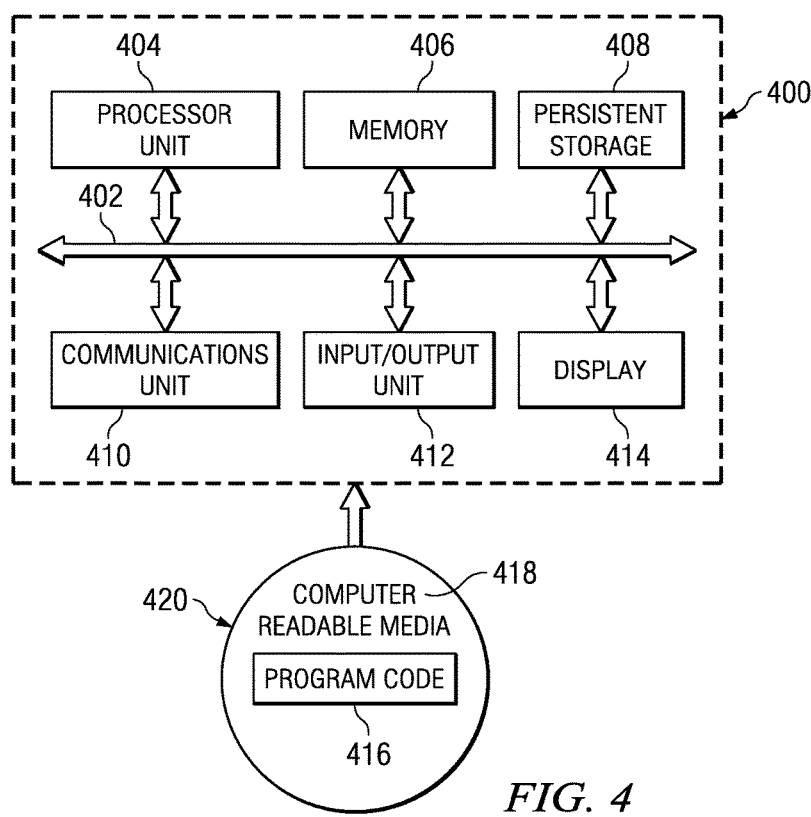
FIG. 4 is an exemplary diagram of a data processing environment in which illustrative embodiments may be implemented.

With reference now to FIGS. 3-4, exemplary diagrams of data processing environments are provided in which illustrative embodiments may be implemented. It should be appreciated that FIGS. 3-4 are only exemplary and are not intended to assert or imply any limitation with regard to the environments in which different embodiments may be implemented. Many modifications to the depicted environments may be made.

FIG. 3 depicts a pictorial representation of a network of data processing systems in which illustrative embodiments may be implemented. Network data processing system 300 is a network of computers in which the illustrative embodiments may be implemented. Network data processing system 300 contains network 302, which is the medium used to provide communications links between various devices and computers connected together within network data processing system 300. Network 302 may, for example, include connections, such as wire, wireless communication links, or fiber optic cables.

In the depicted example, server 304 and server 306 connect to network 302 along with storage unit 308. In addition, clients 310, 312, and 314 connect to network 302. Clients 310, 312, and 314 may be, for example, personal computers or network computers. In the depicted example, server 304 provides data, such as boot files, operating system images, and applications to clients 310, 312, and 314. Clients 310, 312, and 314 are clients to server 304 in this example. Network data processing system 300 may include additional servers, clients, and other devices not shown.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages.

Of course, network data processing system 300 also may be implemented as a number of different types of networks such as, for example, an intranet, a local area network (LAN), or a wide area network (WAN). FIG. 3 is intended as an example, and not as an architectural limitation for the different illustrative embodiments.

With reference now to FIG. 4, a block diagram of a data processing system is shown in which illustrative embodiments may be implemented. Data processing system 400 is an example of a computer, such as server 304 or client 310 in FIG. 3, in which computer usable program code or instructions implementing the processes may be located for the illustrative embodiments. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices. A storage device is any piece of hardware that is capable of storing information on either a temporary basis and/or a permanent basis. Memory 406, in these examples, may be, for example, a random access memory or any other suitable volatile or non-volatile storage device.

Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard and mouse. Further, input/output unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406. These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 416 is located in a functional form on computer readable media 418 that is selectively removable and may be loaded onto or transferred to data processing system 400 for execution by processor unit 404. Program code 416 and computer readable media 418 form computer program product 420 in these examples. In one example, computer readable media 418 may be in a tangible form such as, for example, an optical or magnetic disc that is inserted or placed into a drive or other device that is part of persistent storage 408 for transfer onto a storage device, such as a hard drive that is part of persistent storage 408.

In a tangible form, computer readable media 418 also may take the form of a persistent storage such as a hard drive, a thumb drive, or a flash memory that is connected to data processing system 400. The tangible form of computer readable media 418 is also referred to as computer recordable storage media. In some instances, computer readable media 418 may not be removable.

Alternatively, program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media such as communications links or wireless transmissions containing the program code.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown.

As one example, a storage device in data processing system 400 is any hardware apparatus that may store data. Memory 406, persistent storage 408, and computer readable media 418 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

The different advantageous embodiments recognize that increased time and effort occurs when parts are created for an environment in which different types of computer aided design platforms are used. Thus, the different advantageous embodiments provide a computer implemented method, apparatus, and computer usable program code for managing parts used by different types of computer aided design systems.

The different advantageous embodiments provide an environment with a single source of parts. In these examples, a single source of parts data provides a geometric view of the standard part geometry to different types of computer aided design systems. A geometric view is data that may be used by a computer aided design system. This type of view may be used for review, placement into a design, or other uses. The different advantageous embodiments also may provide other views such as a data centric view and a document centric view.

A data centric view may include various parts of the standard parts specification. This may also include metadata which is data about the part. The document centric view may be presentation of information in a form that may be viewed by a user or operator. The geometric view of the part is delivered as a view of a standard specification generated from the single source of the parts data.

The different advantageous embodiments recognize that existing systems do not employ a single source of data to support various types of computer aided design systems. Currently, with existing computer aided design environments in which multiple computer aided design platforms are present, parts are distributed to different computer aided design systems by labor intensive processes. These processes include creating the same part in a format for each type of computer aided design system.

A geometric master model is created for each part number family. This model configures a set of parts from the geometric master model. The set of geometric master models is independent of the format used by a computer aided design system to handle parts. The set of geometric master models is stored in association with the set of standards governing the set of parts to form content for the set of parts.

In these examples, a geometric master model may take various forms. For example, the geometric master model may be in an extensible markup language (XML) format in which the information needed to form a three-dimensional drawing for the part is present. Further, the geometric master model also may include information about various attributes that may be present. These attributes may include dimensions.

For example, the information in the extensible markup language format may describe an object such as a cube. The cube may have a length, width, and height. The attributes may provide values for the length, width, and height. These values may be single values or a range of values for each dimension. This attribute information also may be part of the extensible markup language file or may be in a separate data structure such as a table.

In response to a request to distribute a selected part, content associated with the selected part is sent to a storage system. In response to a request for the selected part for use by a selected type of computer aided design system in the different types of computer aided design systems, a specific part is created that is usable by the selected type of computer aided design system from the content stored in the storage system to form an explicit model for the part.

In other words, an explicit model is a specifically numbered or otherwise identified part that is usable by a particular type of computer aided design system. In other words, an explicit model is a model that has been associated with some identifier for use. The model may be sent for use by the selected type of computer aided design system.

Figure 5:
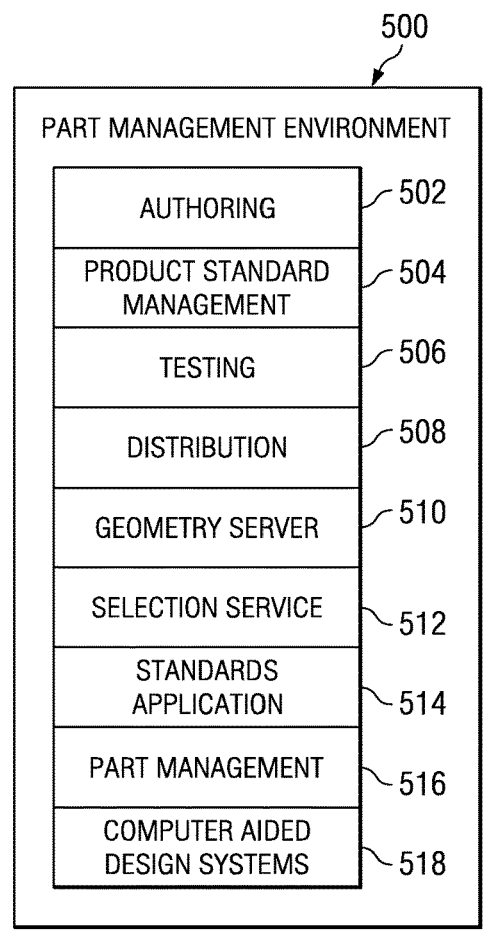
FIG. 5 is a part standard geometry management environment in accordance with an advantageous embodiment.

With reference now to FIG. 5, a part standard geometry management environment is depicted in accordance with an advantageous embodiment. Part standard geometry management environment 500 is an environment that provides a capability to manage data about products. More specifically, this environment is one in which resources, processes, tools, data, networks, and other components integrate to allow for management of data relating to product standards.

This management includes, for example, without limitation, offering, publishing, and delivery of product standard data. In this example, part management environment 500 includes authoring 502, product standard management 504, testing 506, distribution 508, geometry server 510, selection service 512, standards application 514, part management 516, and computer aided design systems 518.

Authoring 502 includes programs, applications, and other processes used to create parts. Product standard management 504 also contains programs, applications, and other processes used to manage a set of standards for the parts. In these examples, the set of standards are rules and/or constraints regarding the parts. These standards may be used to identify values for attributes or other metadata for the models. For example, a set of standards may identify ranges or sets of dimensions, tolerances for dimensions, materials used for parts, processes used to manufacture parts, and other suitable information. All of the information for a part is referred to collectively as content or parts standard data.

This information may be used to generate a geometric master model of the part. This geometric master model is non-specific with respect to different types of computer aided design systems. The geometric master model may include the information needed to create a three-dimensional model of the part as well as the metadata describing the part.

Testing 506 performs validation testing and regression testing. Regression testing may be applied to revisions of data for parts generated by the enterprise geometry service. In these examples, testing 506 may process the geometric master model to create several explicit forms of the geometry. An explicit is the result of exercising the geometric master model to produce an output in a specific computer aided design system that results in a model that corresponds to a complete part number.

The geometric view is then analyzed for conformance to a part's standard specification to ensure that the geometric master model is capable of producing the correct output when required. This testing may embody generation of various explicit part geometry from the geometric master model. These geometric views may be referred to as children while the parts standard specification in the geometric master model may be referred to as the parent. These children are analyzed for compliance to the constraints represented in the parent.

For example, with the geometry of a bolt, analysis may involve validating that the grip length depicted in the part number corresponds to the grip length feature in the geometry. In another example, again using the geometry of a bolt, the diameter size depicted in the part number may be validated to ensure that diameter size correctly corresponds to the geometric diameter feature of the bolt.

Distribution 508 generates different views of the part standard. One view is a geometric view. This view may be, for example, geometric master model of the parts used to create explicit models of a part that are specific to a particular type of computer aided design system. Another view is the document view which provides a textual view of the standard. Another view is the data view where metadata about the part standard and selection parameters may be sent and generated. This information may be used by an operator to select a particular part from a collection of parts.

For example, distribution 508 may transform the representation of a part into a format for use by users of the parts. For example, distribution 508 may generate documentation for users to select parts and values for various attributes. Additionally, distribution 508 also may generate a document containing the standards for the different parts. The standards and the selection criteria form information that a user may employ to select parts. In these examples, the geometric master model provides information needed to generate a three-dimensional model or representation of the part for a computer aided design system.

The geometric master model may take the form of an extensible markup language document describing the three-dimensional drawing. For example, this information may include a description of the primitive or other geometry needed to form the three-dimensional model. The description of the three-dimensional geometry form of the part may be described in the document using parametric equations.

A parametric equation allows the use of arbitrary values such as parameters or attributes in place of independent variables in equations which, in turn, provide values for dependent variables. These equations may be used to describe lines, curves, and other shapes. The values for the different parameters may be supplied at a later point in time to provide a specific instance of a particular part.

Further, the geometric master model also may include metadata for the attributes about the parts. This metadata may include, for example, attributes, dimension information, information about materials used for the part, a description of processes used to create the part, testing to be performed on the part, standards for the part, and other suitable information related to a particular part.

Information identifying attributes about the model may be located in the extensible markup language file. In other advantageous embodiments, these attributes may be located in a separate data structure such as a table.

Geometry server 510 stores content for the model. Further, geometry server 510 may create a dimension drawing or model for the part in response to a request for the part. In these examples, the part is created from the extensible markup language (XML) file. Further, the various attributes are placed into the file along with a three-dimensional drawing to form a model for the part. At this point, however, various values for the attributes are not yet filled. Selection service 512 provides a capability to select and create parts. This selection may include a particular type of computer aided design system in which the part is to be used.

This component takes selections made by a user and sends them to geometry server 510 and standards application 514 to generate a three-dimensional model for the particular part. The three-dimensional model for the part is in a specific format for a particular type of computer aided design system in these examples. In response to receiving a selection, geometry server 510 uses the geometric master model and the dimension information to create a three-dimensional drawing or geometry for the part.

Standards application 514 adds metadata to the three-dimensional drawing to create the three dimensional model that is usable by a particular computer aided design system. This metadata may include, for example, materials for the part, tolerances, testing procedures, and other suitable information.

Part management 516 receives and distributes three-dimensional models generated by standards application 514. Additionally, part management 516 also may store three-dimensional models that have been previously created. Computer aided design systems 518 are the data processing systems that use the parts for designing products. In this manner, part management environment 500 provides a single source to distribute and manage models for parts that may be used by different types of computer aided design systems.

Figure 6:
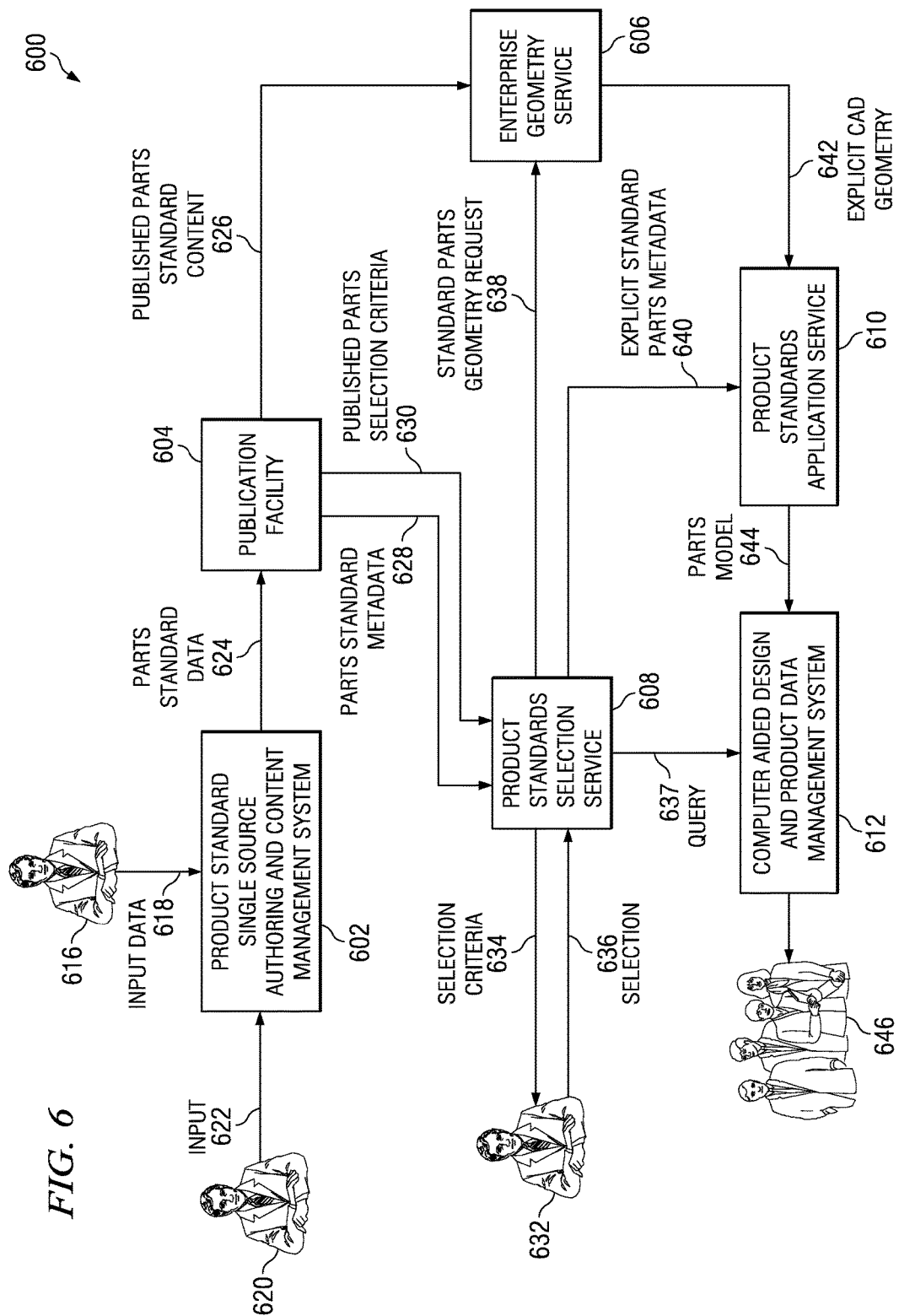
FIG. 6 is a diagram illustrating dataflow in a part standard geometry management environment in accordance with an advantageous embodiment.

Turning now to FIG. 6, a diagram illustrating dataflow in a part standard geometry management environment is depicted in accordance with an advantageous embodiment. In this example, environment 600 is an example of one implementation of part management environment 500 in FIG. 5. As depicted, environment 600 includes product standard single source authoring and content management system 602, publication facility 604, enterprise geometry service 606, product standards selection service 608, product standards application service 610, computer aided design (CAD) and product data management system 612.

In this example, operator 616 may be a product standards author. Operator 616 may generate content for a part in a format that may be used for single source standard part data. In other words, operator 616 may create standards that may be used for specifying parts. Operator 616 also may create geometric master models, as well as other suitable information.

In these examples, the format of the standards may be, for example, an extensible markup language format. Operator 616 sends input data 618 to product standard single source authoring and content management system 602. This input data may include, for example, geometric master models and product standards and product specifications.

Product standard single source authoring and content management system 602 includes configuration control facilities. In these examples, the configuration control facilities may provide mechanisms to manage versions of data as well as checking data in and out of the system.

Product standard single source authoring and content management system 602 also may ensure data integrity of the part data. This integrity may be ensured by performing validation and regression testing. In these illustrative examples, regression testing may be performed to ensure that no uncoordinated changes to the standard have been inadvertently introduced.

In these examples, operator 620 may be a standards engineer. Operator 620 also may create a model of a part for each part standard using a tool, for example, such as eCATALOG, which is available from PARTsolutions. This model is a geometric master model and may be created using the standards information stored in product standard single source authoring and content management system 602. As mentioned before, the geometric master model is in a non-specific format with respect to computer aided design systems that use the parts generated from the geometric master model. In these examples, the geometric master model may be in the form of an extensible markup language (XML) file.

With this type of implementation, the extensible markup language file contains the information needed to generate a three-dimensional drawing of the part.

Further, this geometric master model also may include metadata that describes various features or attributes about the part. These attributes may include, for example, materials, processes, dimensions, standards, testing, and other suitable information about the part. These attributes are part of the metadata for a particular part. In other advantageous embodiments, this type of metadata may be located in a separate data structure from the extensible markup language (XML) file.

In other words, this geometric master model may be used to determine a range in variations from the data or versions of the data for a particular computer aided design platform. For example, if the part is a bolt, the part may have dimensions such as a length and various widths or diameters. These properties or attributes of the bolt may be variable depending on the particular standard that is applied. These attributes may be filled depending on the particular application or standard.

Operator 620 may send input 622 to product standard single source authoring and content management system 602. Product standard single source authoring and content management system 602 generates parts standard data 624. This data may contain all information about the part standards. This information may include, for example, without limitation, metadata, data tables, dimension tables, related product standards, usage, rules, and other suitable forms of data. This parts standard data is sent to publication facility 604. In these examples, the parts standard data is content that includes the geometric master models, the standards that apply to the geometric master models, selection criteria that may be used to generate specific parts from the geometric master models, and other suitable information.

Publication facility 604 may be used to create different views of a part from this information. The form of the document is selected to allow for creation of traditional document views and data views. A traditional document view is one that may be viewed by an operator. An example of a traditional document view is a portable document format (PDF) file. A data view is information used to create three-dimensional models for use by computer aided design and product data management system 612. This data view may include, for example, a table of dimensions that may be usable for particular parts.

Parts standard data 624 may include the data needed to generate different views of the particular part. These views may include, for example, data views, document views, and geometric views. In these examples, the data needed to create a geometric view of the part may include the standard parts specification, the design standards, supplementary engineering, and manufacturing information to support computer aided design systems, and any other suitable information needed to create the geometric view of the part.

These views are output by publication facility 604 as published parts standard content 626, parts standard metadata 628, and published parts selection criteria 630. In other words, publication facility 604 may publish new parts standard data or any changes that may occur to parts standard data 624 to various components to produce the appropriate views of that data.

Published parts standard content 626 is sent to enterprise geometry service 606, while parts standard metadata 628 and published part selection criteria 630 are sent to product standards selection service 608. Published parts standard content 626 contain the geometric master model for the part. Published parts standard content 626 contains the information needed to generate a three-dimensional drawing for a model of the part.

Published parts standard content 626 may include the geometric master model and data needed to support this geometric master model. This data may be placed in a table and may include, for example, dimension data that may be applied to the geometric master model to create an explicit model from the geometric master model.

In these examples, an explicit model is an example of one type of geometric view that may be created from the geometric master model. In another example, the geometric view may take the form of a U3D format, which is a format that may be viewed directly from a web browser and allows for rotation and zooming. Of course, other types of views may be generated from the geometric master model depending on the particular implementation.

In these illustrative examples, parts standard metadata 628 is "bulk" metadata about the entire part standard specification. Parts standard metadata 628 includes, for example, criteria that may be specified by the parts specification. This type of information may be, for example, a part category, a classification, a part family, and any other suitable data about the part. Published parts selection criteria 630 includes, for example, a type of material, a type of finish, environmental constraints, size, mating parts, and other suitable criteria.

In these examples, operator 632 may be, for example, a design engineer. The design engineer may create models of parts for use by computer aided design and product data management system 612. Operator 632 may receive selection criteria 634 from product standards selection service 608. Selection criteria 634 allows operator 632 to apply selection 636 to published parts selection criteria 630 in product standards selection service 608 to generate a specific part for use with a given application or purpose.

An example of selection criteria 634 may be, for example, a type of material, a type of finish, environmental constraints, size, mating parts, and other suitable criteria. An example of selection 636 may be a specific material of the designed part, such as aluminum, which then limits the type of bolt materials that can be used in that design. Other examples of selection 636 may include a specific finish based on material type, a specific hole diameter based on the tolerances of the design, a specific mating part, or some other suitable parameter.

This selection criteria may be used to select standard parts. Operator 632 returns selection 636 to product standards selection service 608. In response, product standards selection service 608 determines whether the selected part is an existing part. This determination is made by sending query 637 to computer aided design and product data management system 612. The query is to find out whether the selected part is currently stored in computer aided design and product data management system 612.

If the selected part is not an existing part, product standards selection service 608 generates standard parts geometry request 638. This request is sent to enterprise geometry service 606. In response to receiving this request, enterprise geometry service 606 creates geometry that corresponds to a unique part number. In these examples, the unique part number may be generated by enterprise geometry service 606 based on selection criteria identified by a user. In these examples, the selection criteria entered by the user may be used as a key to identify a row of data from the dimension table used to create the geometry view of the part.

For example, one user input may be the diameter of the bolt. This diameter may represent a value of code that is then compared against the key column in the dimension table. A match of this code against the corresponding value in the key column identifies a row of data in this table. The selected row of data is then applied to the master geometric model of the part to create a specific geometric view that may be used. This specific geometric view may be applicable to a specific type of computer aided design system.

Enterprise geometry service 606 creates a geometric view that is specific to a particular computer aided design system to form explicit computer aided design (CAD) geometry 642. This geometric view is the three-dimensional model containing attributes to be filled with values. In these examples, explicit computer aided design geometry 642 is a three-dimensional model containing attributes that have been filled with values. This three-dimensional model is generated from the geometric master model in these examples.

Explicit computer aided design geometry 642 is sent to product standards application service 610. Product standards application service 610 also sends explicit standard parts metadata 640 to product standards application service 610. In these illustrative examples, explicit standard parts metadata 640 is metadata about the specific "explicit" part standard that may be derived from parts standard metadata 628. Examples of metadata that are specific to the "explicit" part standard are data that directly correlates to an explicit part number. For example, this data may be material, size, finish, locking style, or some other suitable parameter for a particular part number.

Product standards application service 610 uses explicit standard parts metadata 640 and explicit computer aided design geometry 642 to create parts model 644. In this example, parts model 644 is a three-dimensional model that is usable by a particular type of computer aided design system utilized in computer aided design and product data management system 612. Parts model 644 may be manipulated and/or used by a customer in customers 646, who use computer aided design and product data management system 612. Parts model 644 is sent to computer aided design and product data management system 612 for storage and distribution.

In this example, parts model 644 is a specific instance of explicit computer aided design geometry 642 containing explicit standard parts metadata 640. In other words, the model contains attributes with values and may be used to design components. Parts model 644 may include the particular geometry for the different computer aided design platforms as well as the metadata for that part.

Computer aided design and product data management system 612 then provides the part to customers 646. Computer aided design and product data management system 612 also may store previously generated parts so that the parts do not have to be recreated.

Figure 7:
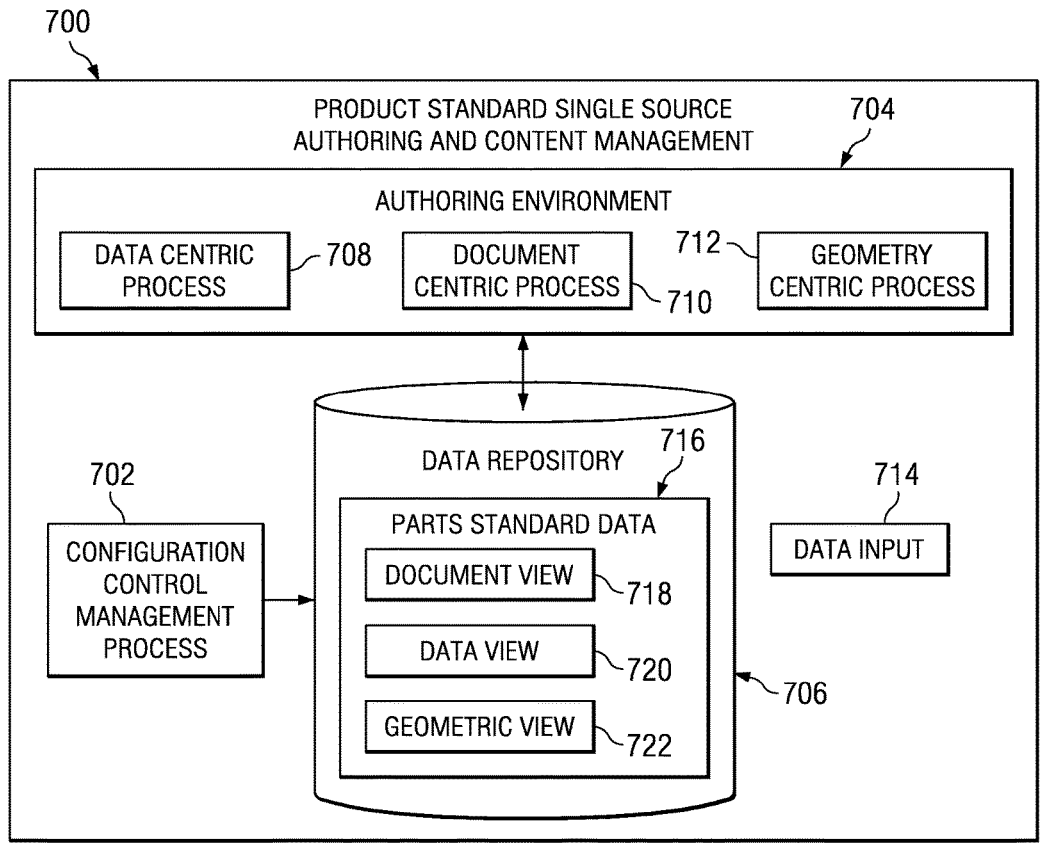
FIG. 7 is a diagram of a product standard single source authoring and content management system in accordance with an advantageous embodiment.

With reference now to FIG. 7, a diagram of a product standard single source authoring and content management system is depicted in accordance with an advantageous embodiment. In this example, product standard single source authoring and content management system 700 is an example of one implementation of product standard single source authoring and content management system 602 in FIG. 6.

In this illustrative example, product standard single source authoring and content management system 700 includes configuration control management process 702, authoring environment 704, and data repository 706. Authoring environment 704 may include data centric process 708, document centric process 710, and geometry centric process 712. These different processes may create different views in response to receiving data input 714. Data input 714 may include, for example, standards, specifications, and other data relating to parts.

These different processes when in authoring environment 704 may generate parts standard data 716 which may be stored in data repository 706. Parts standard data 716, in these examples, includes document view 718, data view 720, and geometric view 722.

In these examples, document view 718 provides a traditional paper-like view. Data view 720 provides a textual view which may be used in other processes. Geometric view 722 provides models of the part related to document view 718 and data view 720. The model in geometric view 722 may be a two-dimensional and/or three-dimensional view of the part.

Configuration control management process 702 may provide management functions with respect to user input such as parts standard data 716. Further, this component may provide interfaces and processes to manage parts standard data 716. Further, configuration control management process 702 may manage parts standard data 716 and/or altered by authoring environment 704. Configuration control management process 702 may validate parts standard data 716. This validation may be performed to insure accuracy of the data in each of the different views and that the correlation between the data in the different views is correct.

Figure 8:
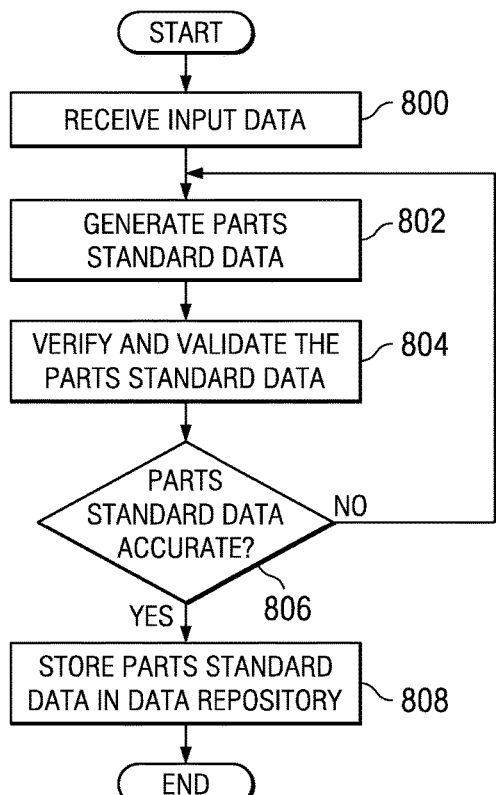
FIG. 8 is a flowchart of the process for managing parts standard data in accordance with an advantageous embodiment.

With reference now to FIG. 8, a flowchart of the process for managing parts standard data is depicted in accordance with an advantageous embodiment. The process illustrated in FIG. 8 may be implemented in product standard single source authoring and content management 700 in FIG. 7.

The process illustrated in FIG. 8 may be initiated for new parts. Further, this process may also be used when a change has occurred to standard.

The process begins by receiving input data (operation 800). This input data may be any part standard and/or specification that may be managed within a part standard geometry management environment. The process generates parts standard data (operation 802). In these examples, the parts standard data contains a document view, a data view, and a geometric view. Operation 802 may be performed using authoring environment 704 in FIG. 7. This authoring environment may allow different operators or users to create different views from the part standard data.

For example, operation 802 may provide an environment for generating documents, data, and models. Further, this environment also may allow generating relationships between the different views. The process then verifies and validates the parts standard data (operation 804). This verification is performed to insure the accuracy of the data in each of the views and the correlation of the data between the different views.

One manner in which verification may be performed includes, for example, generating a number of samples of the explicit part standard geometry of a part standard into a computer aided design system. The dimensional aspects of the geometry may be analyzed and compared against data from the part standard specification. A match between the dimensional aspects and the data from the part specification may confirm accuracy of the geometric view of the part. A failure of a match may indicate that the master model and the dimension table may need to be audited for possible errors and corrections made as deemed necessary.

The process then determines whether the parts standard data is accurate (operation 806). If the parts standard data is not accurate, the process returns to operation 802 to regenerate the data and make correction to errors. If the parts standard data is accurate in operation 806, the process then stores the parts standard data in a data repository (operation 808) with the process terminating thereafter.

Figure 9:
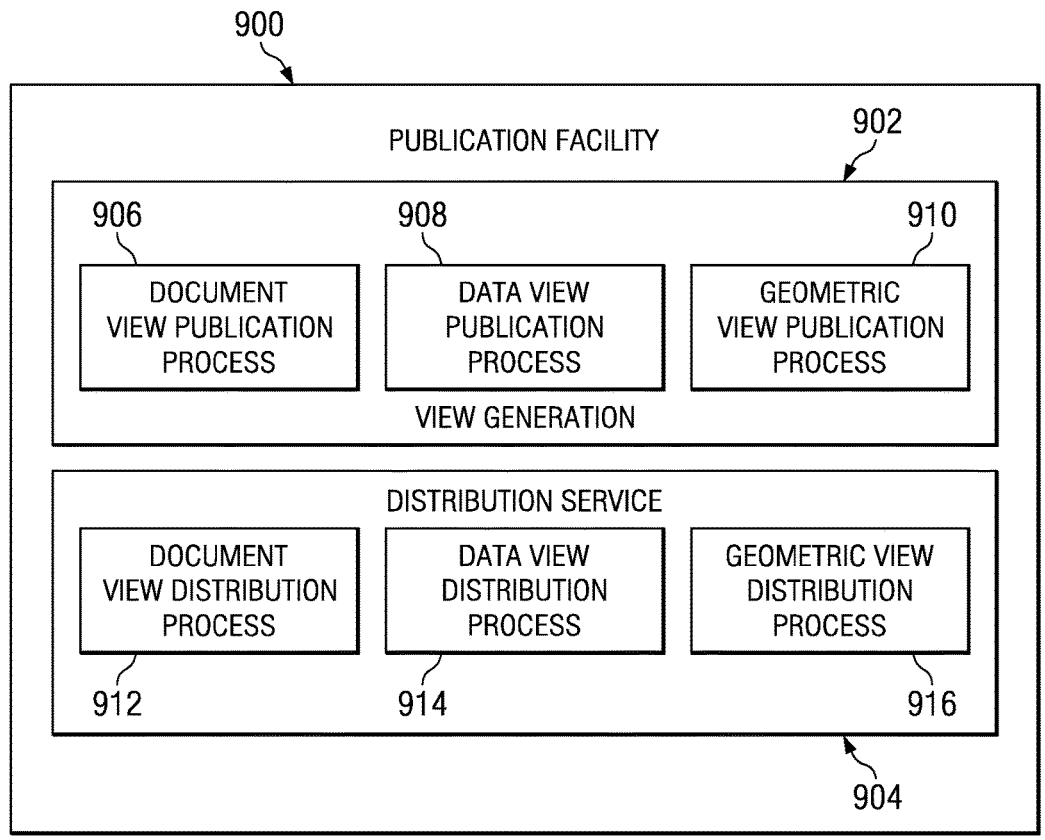
FIG. 9 is a diagram illustrating a publication facility in accordance with an advantageous embodiment.

With reference now to FIG. 9, a diagram illustrating a publication facility is depicted in accordance with an advantageous embodiment. Publication facility 900 is an example of one implementation for publication facility 604 in FIG. 6. In this example, publication facility 900 includes view generation 902 and distribution service 904.

View generation 902 may generate different views from parts standard data stored in a product standard single source authoring and content management system.

In this example, view generation 902 includes document view publication process 906, data view publication process 908, and geometric view publication process 910. These different processes receive parts standard data from a data repository such as, for example, data repository 706 in FIG. 7. Document view publication process 906 may generate documents that may be viewed by users. These documents may include, for example, word files, pdf files, and other suitable document forms.

Data view publication process 908 generates data that may be used, for example, to create particular instances of models from geometric views of parts. Geometric view publication process 910 may generate a geometric view of the part. This geometric view may be, for example, a master model that may be in published parts standard content 626 in FIG. 6.

The different views generated through view generation 902 may be distributed using distribution service 904. This service may include document view distribution process 912, data view distribution process 914, and geometric view distribution process 916. These different processes may send the different views to the appropriate destinations.

For example, document view distribution process 912 may send a document view to a component such as, for example, product standard selection service 608 in FIG. 6. Data view distribution process 914 may send data for the part to a component such as, for example, product standards selection service 608 in FIG. 6. Geometric view distribution process 916 may send a geometric view to a component such as, for example, enterprise geometry service 606 in FIG. 6.

Figure 10:
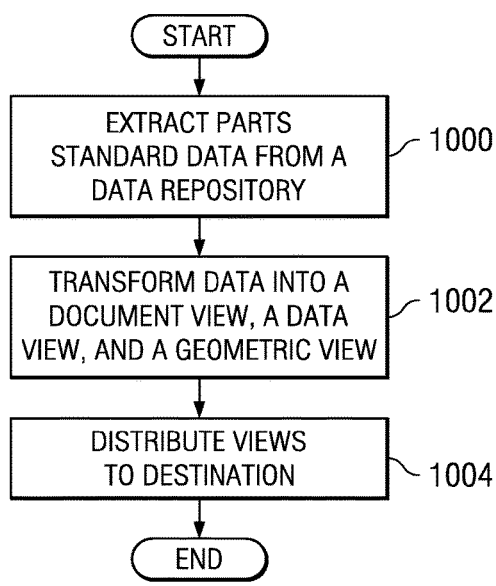
FIG. 10 is a flowchart of a process for distributing different views of part specification data in accordance with an advantageous embodiment.

With reference now to FIG. 10, a flowchart of a process for distributing different views of part specification data is depicted in accordance with an advantageous embodiment. The process illustrated in FIG. 10 may be implemented in a software component such as, for example, publication facility 900 in FIG. 9.

The process begins by extracting parts standard data from a data repository (operation 1000). This operation may involve sending a request to a software component such as, for example, product standard single source authoring and content management 700 in FIG. 7 to obtain the data managed by that component.

The process then transforms the data into a document view, a data view, and a geometric view (operation 1002). Thereafter, the different views are distributed to destination (operation 1004) with the process terminating thereafter. In these examples, these different destinations are the different components which may use the different views to manage the parts.

Figure 11:
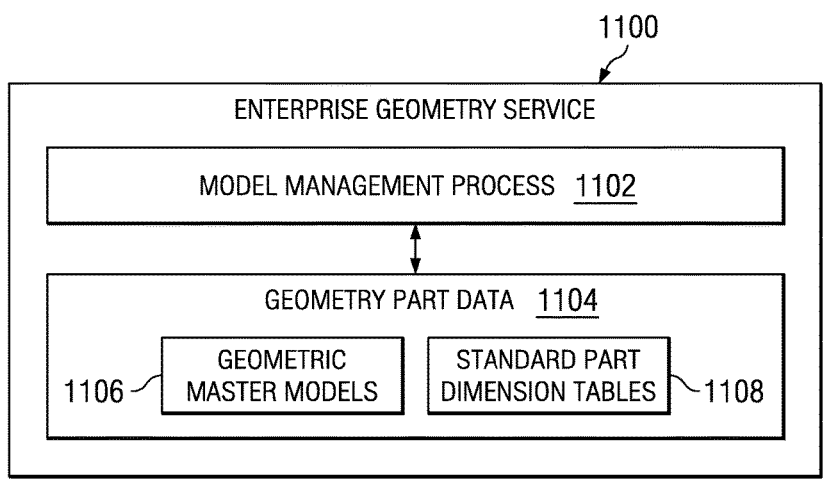
FIG. 11 is a diagram of an enterprise geometry service in accordance with an advantageous embodiment.

Turning now to FIG. 11, a diagram of an enterprise geometry service is depicted in accordance with an advantageous embodiment. Enterprise geometry service 1100 is an example of enterprise geometry service 606 in FIG. 6. In this example, enterprise geometry service 1100 includes model management process 1102 and geometric part data 1104.

Model management process 1102 may receive and store information, such as geometric master model information in geometry part data 1104 as well as create geometries. In particular, model management process 1102 may receive published parts standard content 626 in FIG. 6 for storage in geometric master models 1106. Model management process 1102 may generate geometries or models of the parts in response to a request. The models or geometries generated are, for example, explicit computer aided design geometry 642 in FIG. 6.

In these depicted examples, the geometry part data 1104 contains geometric master models 1106 and standard part dimension tables 1108. Geometric master models 1106 contains a set of one or more models that are neutral with respect to a computer aided design system. Geometric master models 1106 may contain extensible markup language files for each part family. A part standard represents a part family. An example of a part family is NAS1149 washer part specification. A part family may have a number of different models generated from the part standard. This extensible markup language file contains information describing the three-dimensional drawing.

For example, an extensible markup language file for geometric master models 1106 may contain a primitive describing the part. This file contains information needed to create the three-dimensional drawing of the part. The file may contain, for example, primitives, parametric functions describing primitives, or other suitable information.

Geometric master models 1106 may contain specific values. In some cases, a geometric master model may have values that do not change although other parameters may change. For example, the diameter of a pin may be the same regardless of the length of the pin. Ranges of values or ranges of attributes are from the standard part specification and placed in and/or are part of the standard part dimension tables 1108.

Standard part dimension tables 1108 contains information that describes attributes that may be present for a particular part. In other words, standard part dimension tables 1108 may contain information regarding various dimensions of the components in the three-dimensional model in a corresponding geometric master model. These values for the different dimensions may be applied to the corresponding geometric master model to generate a resulting explicit computer aided design geometry in the form of a three-dimensional model.

As discussed above, an explicit geometry is a three-dimensional model that has been generated as an instance of a model within geometric master models 1106. In other words, when a geometric master model has its parameters populated with data, an explicit computer rated design geometry is formed.

Figure 12:
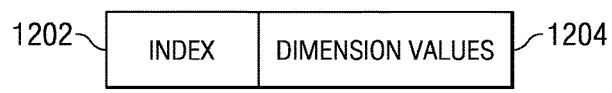
FIG. 12 is a diagram of an entry in a standard part dimension table in accordance with an advantageous embodiment.

With reference now to FIG. 12, a diagram of an entry in a standard part dimension table is depicted in accordance with an advantageous embodiment. In this illustrative example, entry 1200 is an example of an entry that may be found in a table such as one in standard part dimension tables 1108 in FIG. 11.

As depicted, entry 1200 includes index 1202 and dimension values 1204. Index 1202 may be used to identify an entry based on some key or selection entered by the user for a particular part. For example, index 1202 may be, for example, part numbers or sizes for a certain feature on a part. Dimension values 1204 contain a set of values that may specify various dimensions for the part. Each of these values may correspond to a column within the table in which entry 1200 is located.

For example, entry 1200 may be an entry for a bolt head or bolt. Various dimension values may include, for example, a distance across the hexagonal flat features, a diameter of the bolt head, and a material for the bolt. In these different advantageous embodiments, a single table may contain different versions or features for the same part. With this type of implementation, each row may contain variations on features depending on the particular part. For example, the diameter of the bolt may change from entry to entry to represent different versions of the part that may be generated. Dimension values 1204 may correspond to parameters used in a geometric master model to create a particular part.

Figure 13:
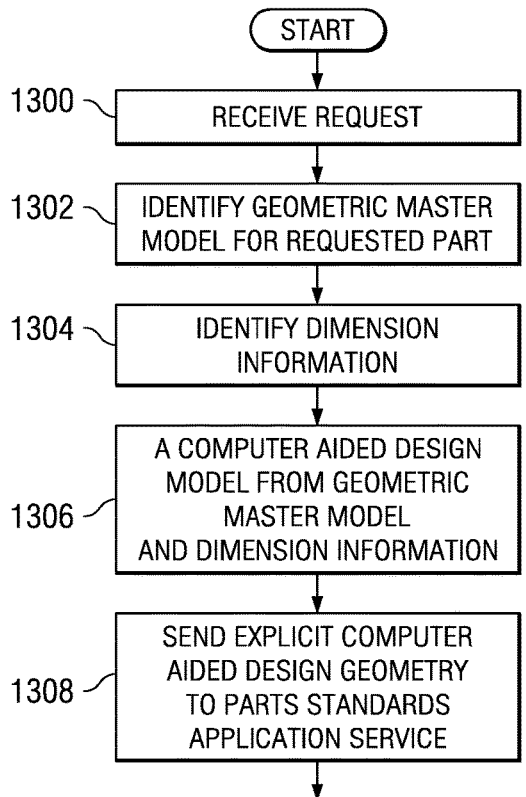
FIG. 13 is a flowchart of a process for creating resolved computer aided design geometry in accordance with an illustrative embodiment.

With reference now to FIG. 13, a flowchart of a process for creating resolved computer aided design geometry is depicted in accordance with an illustrative embodiment. The process illustrated in FIG. 13 may be implemented in a software component, such as enterprise geometry service 1100 in FIG. 11.

The process begins by receiving a request to create geometry for a part (operation 1300). The process identifies a geometric master model for the requested part (operation 1302). The process then identifies dimension information based on the selected criteria and the received request (operation 1304). The dimension data is identified or found in a table, such as a table found in standard part dimension tables 1108 in FIG. 11. This information contains dimension information for a three dimensional drawing of a part based on the received selection criteria.

The process then uses the identified geometric master model and the identified dimension data to create an explicit model using native geometry features in a specific computer aided design system (operation 1306). In these illustrative examples, a native geometry feature is a component in a particular computer aided design system used to generate models. For example, a native feature includes a prism, a cube, a cylinder, a point, a line, a curve, a spine, or some other suitable feature.

These different features are based on object definitions that are specific for each type of computer aided design system. This model may be, for example, a two- or three-dimensional model depending on the particular implementation. The explicit model is then sent to a parts standards application service (operation 1308), with the process terminating thereafter.

Figure 14:
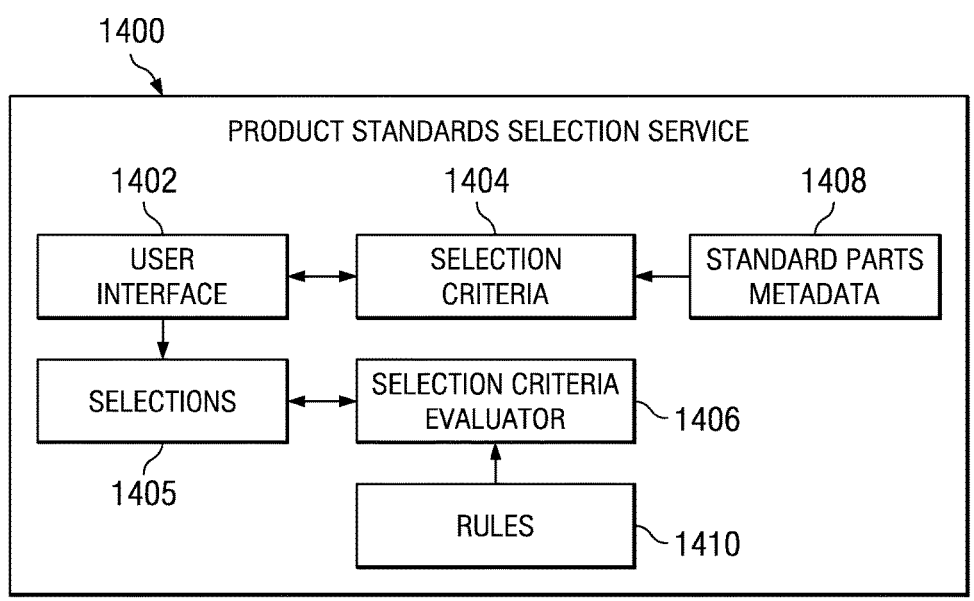
FIG. 14 is a diagram illustrating a product standards selection service in accordance with an advantageous embodiment.

With reference now to FIG. 14, a diagram illustrating a product standards selection service is depicted in accordance with an advantageous embodiment. Product standards selection service 1400 is an example of one implementation for product standards selection service 608 in FIG. 6. In this example, product standards selection service 1400 includes user interface 1402, selection criteria 1404, and selection criteria evaluator 1406.

User interface 1402 may provide a user or other operator an interface to view and select criteria from selection criteria 1404. Standard parts metadata 1408 may be received and used as selection criteria 1404. Standard parts metadata 1408 may be, for example, description, size, material, and/or finish as depicted in parts standard metadata 628 in FIG. 6. User interface 1402 may be, for example, an applet, a script, and/or other code sent to a browser on a remote data processing system at which a user may be located.

In other advantageous embodiments, user interface 1402 may be a web page generation process that generates web pages to present options for selection criteria 1404 to a user. Examples of information that may be selected by a user for user interface 1402 include, for example, without limitation, material, finish, lock mechanism, grip length, thread size, operating temperature, voltage, and other suitable criteria.

When user selections are received by user interface 1402, these user selections form selections 1405. Selections 1405 may be, for example, a request to see what parts are available, selection criteria for particular parts, and an identification of a particular type of computer aided design system.

Selection criteria evaluator 1406 then applies rules 1410 to selection criteria 1404. In this example, selection criteria evaluator 1406 may apply selections such as, for example, a particular instance or type of part, a type of computer aided design system, and other suitable selection criteria. Based on this application of rules 1410, a request may be sent to create the computer aided design model desired by the user. This request may be, for example, standard parts geometry request 638 in FIG. 6.

Figure 15:
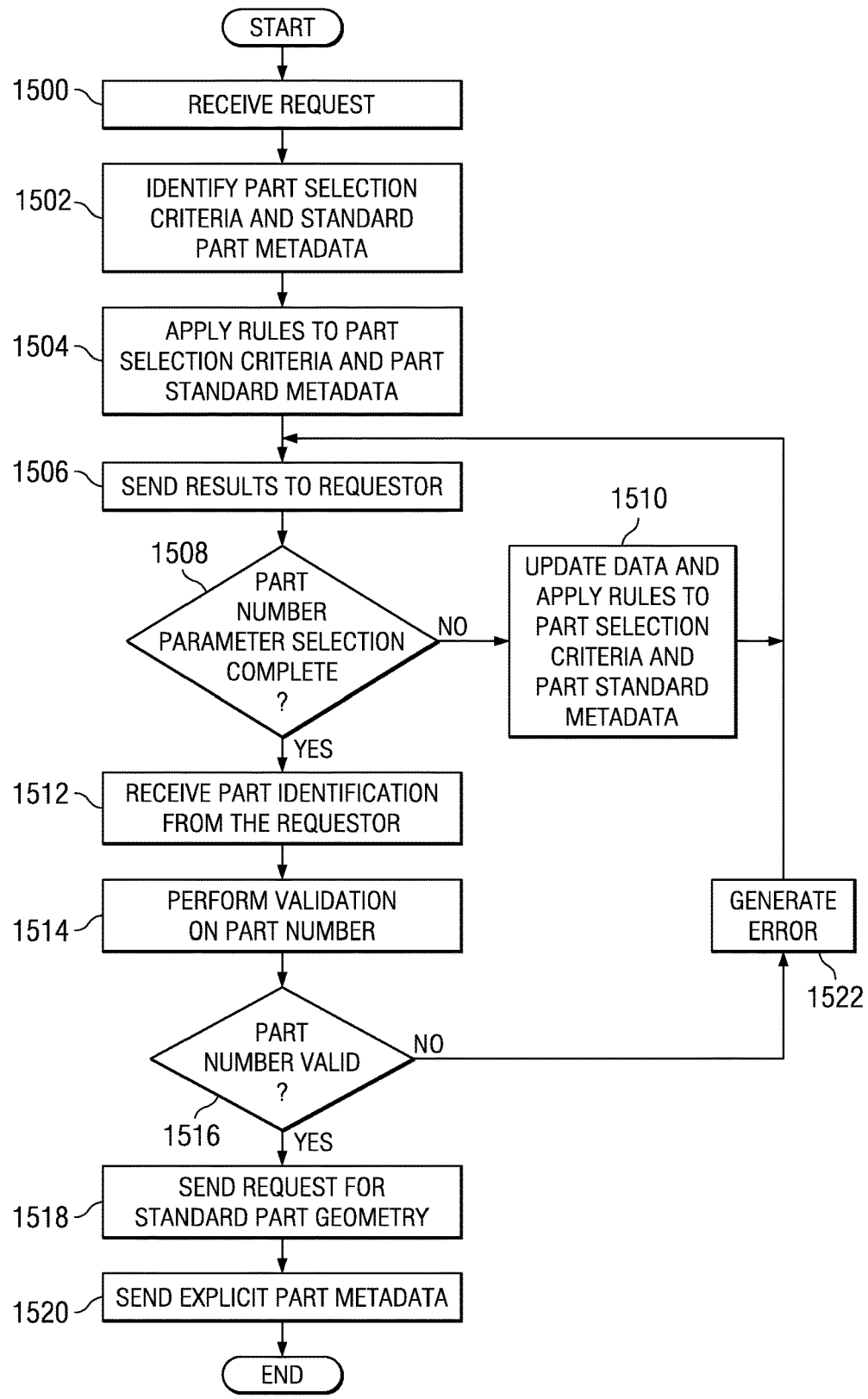
FIG. 15 is a flowchart of a process for generating requests for models in accordance with an advantageous embodiment.

With reference now to FIG. 15, a flowchart of a process for generating requests for models is depicted in accordance with an advantageous embodiment. The process illustrated in FIG. 15 may be implemented in a product standards selection service such as product standards selection service 1400 in FIG. 14.

The process begins by receiving a request from a user (operation 1500). This request may be received through a user interface such as user interface 1402 in FIG. 14. This request may be, for example, a request to see parts that are available, a request for a certain type or a family of a part, or some other request to select a part for use. This type of request may be made when a user/operator requires a model in performing design or evaluation operations.

The process then identifies part selection criteria and standard part metadata (operation 1502). In these examples, this information may be identified from the request received from the user. This identification may be made through receiving user input selecting criteria from parts standard metadata 628 and published parts selection criteria 630 in FIG. 6. Selection of criteria from this type of data may narrow the field of potential candidates. This information may be used to identify a particular part standard number that may be used for generating a part.

The process then applies the rules to part selection criteria and the part standard metadata as identified from the request (operation 1504). The process then sends the results to the requester (operation 1506). A result returned in operation 1506 contains information about a part. These results may be, for example, parts standard metadata 628 and published parts selection criteria 630 in FIG. 6.

This information may be ranged and presented to a user for selection. An example may be information about a particular part standard family. This information may include available materials, finishes, grip length ranges, and other suitable information.

The results also may include rules for selecting specific part parameters based on the intended use of a part. For example, the rules may be whether the part will be used in a pressurized environment, what temperatures the part will be exposed to, maintenance frequency, and other suitable rules. These rules for selection are not always necessarily included but may be provided for aid in selecting a part.

Next, a determination is made as to whether the part number parameter selection is complete (operation 1508). If the part number parameter selection is not complete, data is updated and rules are applied to the part selection criteria and part standard metadata (operation 1510) with the process then returning to operation 1506.

With reference again to operation 1508, if the part number parameter selection is complete, the process then receives a part identification from the requester (operation 1512). In this operation, the requester may configure an explicit part number. In operation 1512, an explicit part number may be configured by selecting valid parameters that are present for a particular part standard specification.

The part standard specification represents a family of parts that may be available or that can be derived from a particular part standard specification. In creating an explicit part number, a selection of available parameters for a part such as material, finish, size, color, and other suitable parameters may form a unique instance of the part. When this instance is associated with a part number, the part number is considered an explicit part number for the particular representation of the part based on the part standard specification in these illustrative examples. The process then performs validation on the part number (operation 1514).

A determination is made as to whether the part number is valid (operation 1516). Operation 1516 is performed to insure that the parameters selected by user are for a valid part number based on a constraint for the part standard specification. This validation also may include insuring that the part number that has been selected can be used in the intended fashion. For example, can the part be used in a non-pressurized environment or will the part be exposed to corrosive conditions. This validation may be performed by determining whether the parameters selected by the user meet or conform to rules for generating part numbers. The particular rules may vary depending on the particular specification.

If the part number is valid, a request is sent for a standard part geometry (operation 1518). In these examples, the request may be sent to a component such as enterprise geometry service 606 in FIG. 6. The process also sends explicit standard part metadata (operation 1520). This explicit part metadata may be sent to a component such as, for example, product standards application service 610 in FIG. 6.

With reference again to operation 1516, if a determination is made that the part number is not valid, then the process generates an error (operation 1522), with the process returning to operation 1506 as described above.

Figure 16:
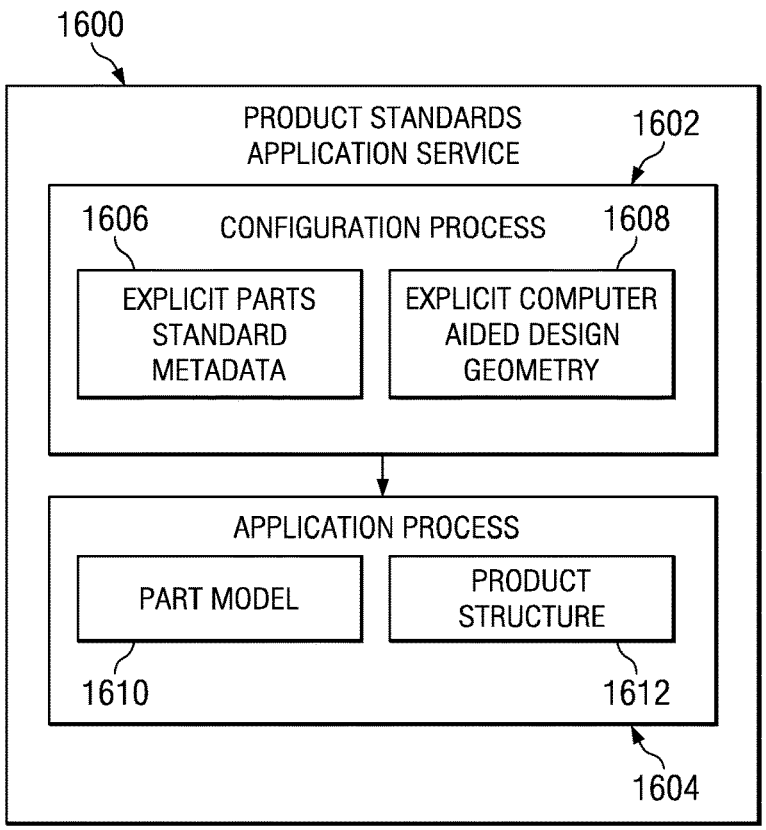
FIG. 16 is a diagram illustrating a product standards application service in accordance with an advantageous embodiment.

With reference now to FIG. 16, a diagram illustrating a product standards application service is depicted in accordance with an advantageous embodiment. Product standards application service 1600 is an example of one implementation for product standards application service 610 in FIG. 6. Product standards application service 1600 includes configuration process 1602 and application process 1604 in this example.

Configuration process 1602 receives explicit parts standard metadata 1606 and explicit computer aided design geometry 1608. Explicit parts standard metadata 1606 may be received from a source such as, for example, product standards selection service 608 in FIG. 6. Explicit computer aided design geometry 1608 may be received from a component such as enterprise geometry service 606 in FIG. 6. Configuration process 1602 may pair explicit parts standard metadata 1606 with explicit computer aided design geometry 1608. This results in part model 1610. Part model 1610 may be applied to product structure 1612 in these examples.

Figure 17:
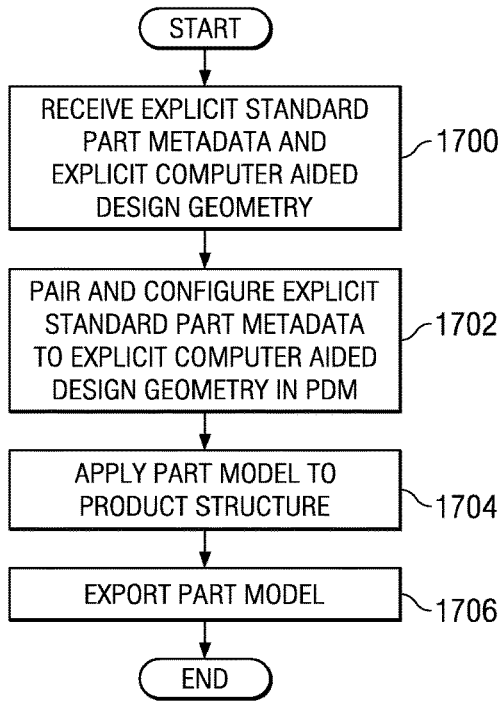
FIG. 17 is a flowchart of a process for generating a part model in accordance with an advantageous embodiment.

With reference now to FIG. 17, a flowchart of a process for generating a part model is depicted in accordance with an advantageous embodiment. The process illustrated in FIG. 17 may be implemented in any software component such as product standards application service 1600 in FIG. 16.

The process begins by receiving explicit standard part metadata and explicit standard computer aided design geometry (operation 1700). The process then pairs and configures the explicit standard part metadata to the explicit computer aided design geometry in product data manager (operation 1702).

A product data manager is a system used to manage data and its interrelationships. Pairing metadata to geometry involves synchronizing a key attribute. For example, the attribute may be a part number. The metadata and geometry may be merged based on this part number. The process then applies the part model to the product structure (operation 1704).

In operation 1704, the explicit computer aided design geometry and the metadata are added into an appropriate location within a product data management system. This appropriate section may vary depending on the structure of the particular product data management system. This type of addition is similar to saving data into a product data structure in which the data is the explicit computer aided design geometry and the metadata. The process then exports the part model for use (operation 1706) with the process terminating thereafter.

Figure 18:
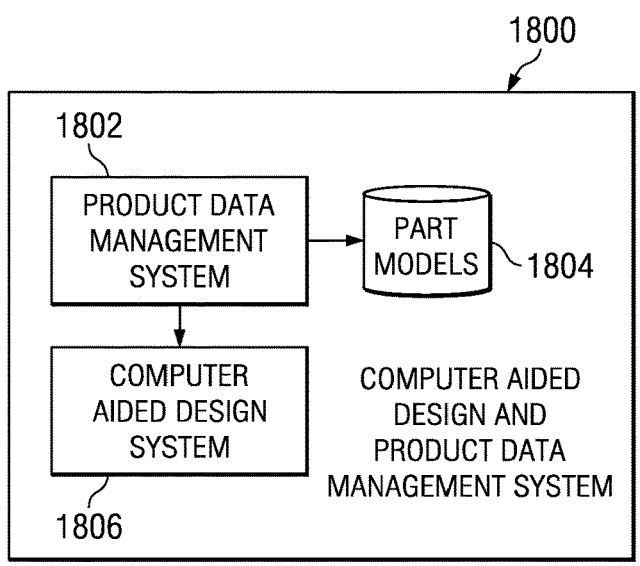
FIG. 18 is a diagram of a computer aided design and product data management system in accordance with an advantageous embodiment.

With reference now to FIG. 18, a diagram of a computer aided design and product data management system is depicted in accordance with an advantageous embodiment. In this example, computer aided design and product data management system 1800 is an example of one implementation for computer aided design and product data management system 612 in FIG. 6. As depicted, computer aided design and product data management system 1800 includes product data management system 1802, part models 1804, and computer aided design system 1806.

Product data management system 1802 may receive and manage part models 1804. Product data management system 1802 may supply a part model from part models 1804 to computer aided design system 1806. Computer aided design system 1806 is a set of computers on which computer aided design software may execute.

Figure 19:
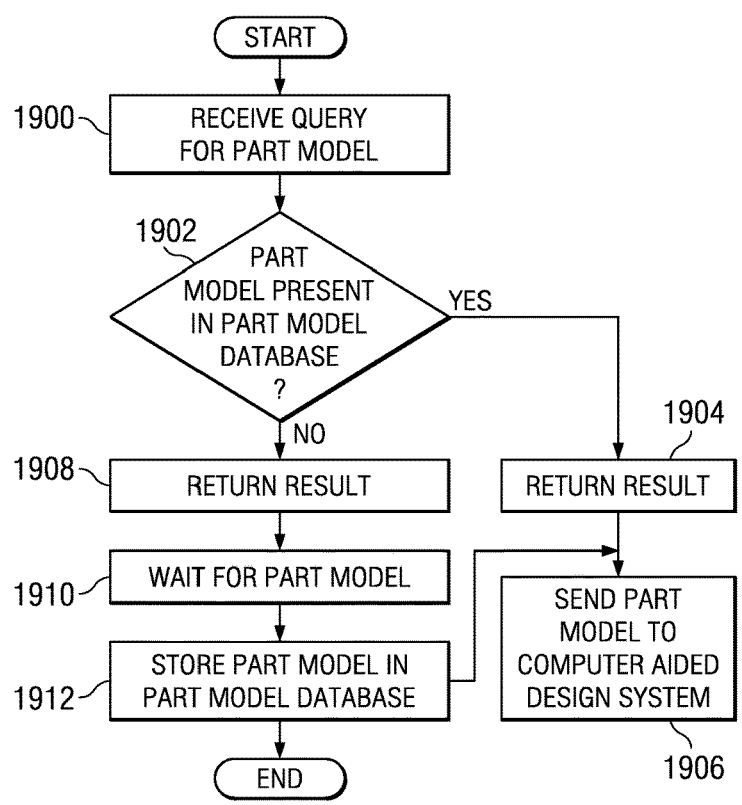
FIG. 19 is a flowchart for process for managing part models in accordance with an advantageous embodiment.

With reference now to FIG. 19, a flowchart of a process for managing part models is depicted in accordance with an advantageous embodiment. The process illustrated in FIG. 19 may be implemented in a software component such as computer aided design and product data management system 1800 in FIG. 18.

The process begins by receiving a query for a part model (operation 1900). This query may be received from a component such as, for example, product standards selection service 608 in FIG. 6. The process then determines whether the part model is present in a part model database (operation 1902). If the part model is present, a result is returned to the requester (operation 1904). The process then sends the part model to the computer aided design system for use (operation 1906) with the process termination thereafter.

With reference again to operation 1902, if the part model is not present in the part model database, a result is returned (operation 1908). This result indicates that the part model is not present and may be used to initiate the generation of the part model in the part standard geometry management environment. The process then waits for the part model (operation 1910). When the part model is received, this part model is stored in the part model database (operation 1912). The process then proceeds to operation 1906 as described above.

The different advantageous embodiments can take the form of an entirely hardware embodiment, an entirely software embodiment, or an embodiment containing both hardware and software elements. Some embodiments are implemented in software which includes, but is not limited to, forms such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD or other similarly purposed media.

Further, a computer-usable or computer-readable medium may contain or store a computer-readable or usable program code such that when the computer-readable or usable program code is executed on a computer, the execution of this computer-readable or usable program code causes the computer to transmit another computer-readable or usable program code over a communications link. This communications link may use a medium that is, for example without limitation, physical or wireless.

A data processing system suitable for storing and/or executing computer-readable or computer-usable program code will include one or more processors coupled directly or indirectly to memory elements through a communications fabric such as a system bus. The memory elements may include local memory employed during actual execution of the program code, bulk storage, and cache memories which provide temporary storage of at least some computer-readable or computer-usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters and are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer implemented method for distributing a parts model to any of a plurality of different types of computer aided design systems and eliminating a need for generating a new parts library and associated data storage in each of the plurality of different types of computer aided design systems added to a product design using the parts model, the computer implemented method comprising:

using a processor unit comprising: a product standard single source authoring and content management system, a product standards selection service, a geometry server, and a product standards application service, for:
receiving an input comprising a part standard representing a part family into the product standard single source authoring and content management system, and deriving therefrom, parts standard data;
responsive to the geometry server receiving a request to distribute a particular part in the part family and using rules in the product standards selection service, transforming, in the geometry server, the parts standard data into a geometric view of a master model of the part family, the master model configured for creating a three-dimensional model of the particular part configured for forming the geometric view, such that the geometric view comprises parametric information about the particular part and dimension information for the particular part;
configuring a set of parts in the part family using the master model, such that a first format of the master model comprises a uniqueness from any format used by the plurality of different types of computer aided design systems in order to handle the parts in the part family;
responsive to the geometry server receiving the request, determining a selected type of computer aided design system associated with the request;
creating an explicit computer aided design geometry comprising a specific geometric view applicable to the selected type of computer aided design system and comprising an attribute that comprises a filled value, via combining:
    an attribute value, generated from selection criteria comprising a key identifying a data location in a dimension table in published parts standard content derived from the part standard; and
    the master model, comprising an attribute comprising an unfilled value, in the geometry server;
creating, in the product standards application service, the part model for use by the selected type of computer aided design system, via applying explicit standard parts metadata from the product standards selection service to the explicit computer aided design geometry;
storing the part model in a computer aided design and product data management system; and
sending the part model to a computer comprising the selected type of computer aided design system.

2. The computer implemented method of claim 1 further comprising:
responsive to the request to distribute the particular part, creating a view of the master model containing information about the particular part to form a document view.

3. The computer implemented method of claim 1, wherein the master model comprises a definition of the three-dimensional model for the particular part and an identification of attributes for the particular part.

4. A computer implemented method for creating a part model and eliminating a need for generating a new parts library and associated data storage in any computer aided design system involved in a product design that uses the part model, the computer implemented method comprising:
using a processor unit comprising: a product standard single source authoring and content management system, a product standards selection service, a geometry server, and a product standards application service, for:
    receiving, into the product standard single source authoring and content management system, an input comprising a part standard representing a part family, and deriving therefrom, parts standard data;
    creating, in the product standard single source authoring and content management system, parts standard data for a part;
    responsive to the geometry server receiving a request to distribute a particular part in the part family and using rules in the product standards selection service, transforming the parts standard data into: a geometric master model, standards that apply to the geometric master models, and parts selection criteria for generating specific parts from the geometric master model, the standards comprising criteria specified by a parts specification comprising: a part category, and a classification;
    validating, in the product standard single source authoring and content management system, the parts standard data via determining:
        an accuracy of a set of views in the parts standard data, the set of views comprising: a document view, a data view, and a geometric view; and
        a correlation between each different view for the part;
    responsive to finding the parts standard data inaccurate, the product standard single source authoring and content management system regenerating the parts standard data and revalidating the parts standard data;
    responsive to finding the parts standard data accurate, storing the parts standard data in the product standard single source authoring and content management system;
    creating and storing, in the geometry server, the geometric master model comprising a format, neutral with respect to any computer aided design system in order to handle parts information;
    receiving, in a geometry service, a request for the part from a client computer using a particular type of computer aided design system;
    determining, in response to the request, the particular type of computer aided design system in use by the client computer;
    creating, using the geometric master model, comprising an attribute that comprises an unfilled value, in the geometry service, an explicit computer aided design geometry via combining a specific geometric view, applicable to the particular type of computer aided design system, with a value, for the attribute, generated from selections comprising a key identifying a data location in a dimension table in published parts standard content derived from the part standard;
    creating, in the product standards application service, the part model for use by the particular type of computer aided design system, via applying explicit standard parts metadata from the product standards selection service to the explicit computer aided design geometry;
    storing the part model in a computer aided design and product data management system; and
    sending the part model to the client computer.

5. The computer implemented method of claim 4, further comprising:
the parts selection criteria comprising: a type of material, a type of finish, an environmental constraint, and a size.

6. The computer implemented method of claim 4, further comprising presenting, using the product standards selection service, selection criteria derived from the parts standard data.

7. An apparatus that comprises:
a network data processing system; and
a part management environment configured to: execute on the network data processing system, such that the part management environment comprises:
    a product standard single source authoring and content management system configured to: receive an input that comprises a part standard that represents a part family, and to generate parts standard data based upon the part standard;
    a product standards selection service configured to:
        receive input that comprises selection criteria for:
            a part model; and
            a particular computer aided design system; and
        send a request for the part model configured for use by the particular computer aided design system to: a geometry server, and to a computer aided design and product data management system;
    the geometry server configured to:
        receive a request to distribute a particular part in the part family;
        determine the particular computer aided design system;

transform, based upon rules in the product standards selection service, the parts standard data into: a geometric master model, standards that apply to the geometric master models, and parts selection criteria configured for generation of specific parts from the geometric master model, such that the standards comprise criteria specified by a parts specification that comprises a part category; and create an explicit computer aided geometry for the particular computer aided design system based upon the request for the part model and from the geometric master model derived from the part standard, such that the geometric master model comprises a first format, independent of differing formats used by the plurality of different types of computer aided design systems in communication with the apparatus, that comprises attributes that comprise unfilled values;

a product standards application service configured to create the part model based upon a combination of the explicit computer aided geometry with explicit standard parts metadata that comprises values, based upon parts standard data based upon a standard part, for the attributes that comprise unfilled values; and a computer aided design and product data management system configured to store the part model and to transmit the part model to the particular computer aided design system.

8. The apparatus of claim 7, further comprising the geometry server configured to:
select the geometric master model and metadata based upon the request to distribute the particular part; and
apply the metadata to the geometric master model to create the explicit computer aided geometry.

9. The apparatus of claim 8, wherein the geometric master model is stored in an extensible markup language file.

10. A non-transitory computer recordable storage medium configured to: store a part management environment, such that the part management environment comprises:
a processor unit that comprises: a computer aided design and product data management system that comprises a storage capacity for a part model produced responsive for a request for the part model, a product standard single source authoring and content management system, a product standards selection service, a geometry server, and a product standards application service;
the product standard single source authoring and content management system authoring component configured to create, from a received part standard input that represents a part family that comprises a set of parts, data for the set of parts that comprises a platform that comprises a format, unique from any format used by a plurality of different types of computer aided design systems configured to handle parts information, such that a geometric master model that represents a part family remains independent of any format used by the plurality of different types of computer aided design systems, and comprises: information needed to form a three-dimensional drawing for a part in the set of parts, and metadata describing attributes about the part;
a distribution component configured to transform data for the part in the set of parts into: published parts standard content, parts standard metadata, and published parts selection criteria;
the geometry server configured to:
receive a request to distribute a particular part in the part family;
determine a particular computer aided design system associated with the request for the part model;
transform, based upon rules in the product standards selection service, parts standard data into:
the geometric master model;
standards that apply to the geometric master model; and
parts selection criteria configured for generation of specific parts from the geometric master model, such that the standards comprise criteria specified by a parts specification that comprises a part category;
create a geometric view of the part in the set of parts generated by the distribution component into an explicit computer aided design geometry based upon the request for the part model and from the geometric master model of the part family derived from the part standard, such that a format of the geometric master model remains unique from formats used by a plurality of different types of computer aided design systems and comprises attributes that comprise unfilled values; and
the product standards application service configured to create, responsive to an absence of an existing part model corresponding to a part model request, the part model based upon a combination of the explicit computer aided geometry with explicit standard parts data that comprises values, based upon the parts standard data based upon a standard part, for the attributes that comprise unfilled values; and
the computer aided design and product data management system configured to: store the part model, and send the part model to the particular computer aided design system.

11. The non-transitory computer recordable storage medium of claim 10, wherein the part management environment further comprises:
a product standard management component capable of managing standards for the set of parts.

12. The non-transitory computer recordable storage medium of claim 10, wherein the parts standard data comprises: the geometric view, a document centric view, and a data centric view.

13. The non-transitory computer recordable storage medium of claim 10, wherein the part management environment further comprises:
a set of computer aided design systems.

14. The non-transitory computer recordable storage medium of claim 10, wherein the part management environment further comprises:
a selection service capable of receiving user input selecting the part from the set of parts for the particular computer aided design system.

15. The non-transitory computer recordable storage medium of claim 10, wherein the part management environment further comprises:
a testing component configured to perform a test on a set of geometric master models for the set of parts, such that the set of geometric master models comprises the geometric master model, and the test configured to determine a conformance of geometric views specific to a computer aided design system to a standard specification.

16. A computer implemented method of creating, storing, and transmitting a part model for use by a plurality of different types of computer aided design systems and eliminating a need to generate a parts library and storage space associated therewith for each of the plurality of different types of computer aided design systems involved in a product design using the part model, the computer implemented method comprising:
using a processor unit comprising a computer aided design and product data management system-for:
creating, from a part standard input representing a part family, in a product standard single source authoring and content management system, a geometric master model of a part, the geometric master model comprising: attributes that comprise unfilled values describing the part, and information for generating a three-dimensional model of the part;
receiving, in a product standards selection service, a request for a selected part for a selected computer aided design system and querying whether storage in the computer aided design and product data management system comprises the selected part;
generating, responsive to an unsuccessful query, a standard parts geometry request from the product standards selection service to a geometry server;
responsive to the geometry server receiving the standard parts geometry request and using rules in the product standards selection service, transforming parts standard data into:
the geometric master model;
standards that apply to the geometric master model; and
parts selection criteria for generating specific parts from the geometric master model, the standards comprising criteria specified by a parts specification comprising a part category;
generating, responsive to the standard parts geometry request in the geometry server, an explicit computer aided design geometry for the selected part;
adding, using a product standards application service, attribute values, from explicit standard part metadata provided by the product standards selection service, to the explicit computer aided design geometry for the selected part and thereby forming the part model; and
storing the part model in the computer aided design and product data management system; and
sending, via the computer aided design and product data management system, the part model to the selected computer aided design system.

17. The computer implemented method of claim 16, further comprising determining whether a plurality of the three-dimensional models of the part can be generated from the geometric master model in compliance with design constraints of the part and, responsive to an affirmative determination:

generating the plurality of three-dimensional models of the part, each one of the generated plurality of the three-dimensional models of the part being respectively for use by one of the plurality of different types of computer aided design systems; and
performing validation testing on each one of the plurality of three-dimensional models of the part.

18. The computer implemented method of claim 17, wherein the validation testing includes analyzing a generated three-dimensional model of the part to ensure that features of the part correspond to information of the master model.

19. The computer implemented method of claim 16, further comprising determining whether the plurality of the three-dimensional models of the part can be generated from the geometric master model in compliance with design constraints of the part and, responsive to an affirmative determination:

generating a plurality of three-dimensional models of the part, each one of the generated plurality of the three-dimensional models of the part for use by one of the plurality of different types of computer aided design systems; and
and performing regression testing on each one of the generated plurality of the three-dimensional models of the part.

20. The computer implemented method of claim 19, wherein regression testing includes applying revisions of data on each generated plurality of the three-dimensional models of the part.

21. The computer implemented method of claim 16, further comprising generating and storing a geometric view of the part, the geometric view facilitating selection of the part by a user.

22. The computer implemented method of claim 21, further comprising generating and storing a document view of the part, the document view providing information on standards for the part.

23. The computer implemented method of claim 22, further comprising generating and storing a data view of the part, the data view including metadata about the standards and selection parameters for the part.

24. The computer implemented method of claim 23, wherein in response to receiving a request for the part from a user:

determining a type of computer aided design system being used by the user;
generating a model of the part from the geometric master model of the part for the type of computer aided design system being used by the user; and
transmitting the generated model of the part to the user.

* * * * *